United States Patent [19]

Chordia

[11] Patent Number: 5,694,973
[45] Date of Patent: Dec. 9, 1997

[54] VARIABLE RESTRICTOR AND METHOD

[76] Inventor: Lalit M. Chordia, 457 Dover Dr., Pittsburgh, Pa. 15238

[21] Appl. No.: 370,483

[22] Filed: Jan. 9, 1995

[51] Int. Cl.$^6$ .............................. F16K 49/00; F16K 31/12
[52] U.S. Cl. ...................... 137/341; 137/487.5; 251/368
[58] Field of Search ........................ 137/487.5, 341; 251/218, 368, 129.11, 36

[56] References Cited

U.S. PATENT DOCUMENTS

| | | | |
|---|---|---|---|
| 4,366,832 | 1/1983 | Henszey | 251/205 X |
| 4,464,563 | 8/1984 | Jewett | 137/341 X |
| 4,609,176 | 9/1986 | Powers | 251/129.11 X |
| 4,766,927 | 8/1988 | Conaster | 251/365 |
| 4,796,661 | 1/1989 | Hishinuma et al. | 137/487.5 |
| 5,318,072 | 6/1994 | Goedecke | 137/487.5 X |
| 5,364,066 | 11/1994 | Dorste et al. | 251/129.11 X |
| 5,377,713 | 1/1995 | Friederich et al. | 251/368 X |
| 5,419,531 | 5/1995 | Hoehn | 251/129.11 X |

FOREIGN PATENT DOCUMENTS

| | | | |
|---|---|---|---|
| 3018317 | 11/1981 | Germany | 251/368 |

*Primary Examiner*—Hoang Nguyen
*Attorney, Agent, or Firm*—Ansel M. Schwartz

[57] ABSTRACT

A variable restrictor. The variable restrictor is comprised of a housing having a high pressure inlet. The housing also has a channel connected to the high pressure inlet. The housing also has a low pressure outlet connected to the channel with the channel disposed between the high pressure inlet and the low pressure outlet. The variable restrictor is also comprised of a mechanism for reducing supercritical fluid at a pressure between 100–12,000 psi from the high pressure inlet to a pressure between 0–800 psi from the low pressure outlet. The reducing mechanism is disposed in the housing and is in contact with the low pressure outlet. Additionally, the variable restrictor is comprised of a pressure transducer disposed in the housing and in contact with the channel to sense the pressure in the channel. A method for restricting fluid comprising the steps of introducing high pressure fluid at a pressure between 100–12,000 psi into a high pressure port of a housing. Next, there is the step of reducing the pressure of the fluid in the high pressure port to a pressure between 0–800 psi as it flows through a channel connected to the high pressure port with a needle of a needle assembly. Then there is the step of sensing the pressure of the fluid with a pressure transducer connected directly to the channel after the pressure of the fluid has been reduced. Next there is the step of moving the needle of the needle assembly to reduce the pressure of the fluid a desired amount based on the pressure sensed in the channel. Then there is the step of flowing the fluid after its pressure has been reduced through a seat channel of a seat made of sapphire. Then there is the step of releasing the fluid through a low pressure outlet port of the housing.

15 Claims, 5 Drawing Sheets

VARIABLE RESTRICTOR AND METHOD

FIELD OF THE INVENTION

The present invention relates generally to a valve that can control flow or pressure used for supercritical or subcritical fluids. Other applications for this technology are in fluid controls in pharmaceutical, food and chemical industries.

BACKGROUND OF THE INVENTION

Regulation of flow or pressure in a supercritical or subcritical fluid extraction or chromatographic system requires the depressurization of the fluid from high pressure to low pressure. The most popular fluid for use with supercritical or subcritical fluid technology is carbon dioxide. When carbon dioxide depressurizes it cools and forms dry ice. This tends to clog the orifice in the depressurizing valve. Heating the valve tends to reduce this problem. Current designs are clumsy and do not lend themselves for manufacturability and servicing. An important design feature is the ability to heat the fluid enough to make sure it is a gas and not dry ice. If too much heat is pumped it would heat the surroundings wasting power and increase the temperature of carbon dioxide which is detrimental since it has to be cooled before pumping back into the extraction vessel.

Besides a heating problem, there is an erosion and flow variation problem. When the carbon dioxide expands from high pressure to low pressure and forms a gas, the density goes down and the volume/velocity goes up. Any extracted or separated material precipitate out of the carbon dioxide and also move at very large velocities with the expanded fluid. These particles act as sand blasting agents and erode the valve seat. This erosion and the change in diameter due to temperature fluctuation cause flow stability problems. Ultimately, the valve seat or even the complete valve has to be replaced.

Traditional design in these valves use o-rings and packings as seal mechanisms. Designs that included these sealing mechanisms required external forces to push on them to provide the sealing force. This meant that the design required the seal to exert the maximum force in case the maximum design pressure was ever used. This results in considerable force on the packing and hence the life of the seal is not very long. To try alleviate this problem, designers have developed multiple seal design, making replace a very tedious job.

The new design envisioned here provides numerous benefits and solve the problems explained above. They are replacing O-rings and packings with spring loaded seals, replacing valve seats with hard, thermally conductive low thermal expansion materials and making valve needle surface very smooth.

Replacing the O-rings with a special energized seals such as the spring loaded seals that are similar to the ones used in HPLC pumps, provide an effective sealing method requiring very minimal force. It is practically "self-sealing". The seal consists of a polymeric body with a metal spring or a O-ring in the middle. The spring pushes the two lips of the seal outside. One side of the seal touches the body of the vessel and the other side of the seal touches the cap. When the pressure inside the vessel increases, it acts against the seal and pushes the lips even further towards the wall. This type of a seal requires very little force to maintain a seal. Besides the reduced seal force, by maintaining a smooth surface on the valve needle, the life of the seal can be considerably increased.

Stainless steel is relatively a soft material. Making the seat out of a hard material such as sapphire, will considerably reduce the erosion problem. Designing the valve seat from a thermally conductive material such as sapphire results in quick transference of heat to the carbon dioxide and eliminates potential plugging problems due to the formation of dry ice. This also reduces the heat load of the valve and minimizes the heater and the associated valve sizes. Making valve seat and the needle from a low thermal expansion material maintains the orifice diameter for the carbon dioxide flow. The elimination of erosion problem and the elimination of orifice diameter variations provides for stable carbon dioxide flow throughout the operation of the valve.

SUMMARY OF THE INVENTION

The present invention pertains to a variable restrictor. The variable restrictor is comprised of a housing having a high pressure inlet. The housing also has a channel connected to the high pressure inlet. The housing also has a low pressure outlet connected to the channel with the channel disposed between the high pressure inlet and the low pressure outlet. The variable restrictor is also comprised of a mechanism for reducing supercritical fluid at a pressure between 100–12,000 psi from the high pressure inlet to a pressure between 0–800 psi from the low pressure outlet. The reducing mechanism is disposed in the housing and is in contact with the low pressure outlet. Additionally, the variable restrictor is comprised of a pressure transducer disposed in the housing and in contact with the channel to sense the pressure in the channel. Preferably, the pressure transducer is in contact with the channel and disposed downstream of the reducing mechanism.

The present invention pertains to a method for restricting fluid. The method comprises the steps of introducing high pressure fluid at a pressure between 100–12,000 psi into a high pressure port of a housing. Next, there is the step of reducing the pressure of the fluid in the high pressure port to a pressure between 0–800 psi as it flows through a channel connected to the high pressure port with a needle of a needle assembly. Then there is the step of sensing the pressure of the fluid with a pressure transducer connected directly to the channel after the pressure of the fluid has been reduced. Next there is the step of moving the needle of the needle assembly to reduce the pressure of the fluid a desired amount based on the pressure sensed in the channel. Then there is the step of flowing the fluid after its pressure has been reduced through a seat channel of a seat made of sapphire. Then there is the step of releasing the fluid through a low pressure outlet port of the housing.

The present invention pertains to a variable restrictor. The variable restrictor comprises a housing having a high pressure inlet, a channel connected to the high pressure inlet, and a low pressure outlet connected to the channel with the channel disposed between the high pressure inlet and low pressure outlet. The variable restrictor is also comprised of a mechanism for reducing supercritical fluid at a pressure between 100–12,000 psi from the high pressure inlet to a pressure between 0–800 psi from the low pressure inlet. The reducing mechanism is disposed in the housing and in contact with the low pressure outlet. The reducing mechanism has a needle assembly with a needle made of sapphire that extends into the channel to reduce the pressure of fluid in the high pressure to a lower pressure as the fluid passes through the channel.

The present invention pertains to a variable restrictor. The variable restrictor comprises a housing having a high pressure inlet, a channel connected to the high pressure inlet, and a low pressure outlet connected to the channel with the channel disposed between the high pressure inlet and low pressure outlet. There is a mechanism for reducing supercritical fluid at a pressure between 100–12,000 psi from the high pressure inlet to a pressure between 0–800 psi from the low pressure inlet. The reducing mechanism is disposed in the housing and in contact with the low pressure outlet. The restrictor also comprises a seat made of a material having a surface smoothness between 0.001 to 1 microns, a hardness of 4–20 mohs, a coefficient of linear thermal expansion of 0–20×10$^{-6}$/°C. and a thermal conductivity of 10–100 W/M-K. The seat has a seat channel. The seat is disposed in the housing downstream of the reducing mechanism. The seat channel is connected with the channel and the low pressure outlet so fluid from the channel passes through the seat channel and to the low pressure outlet.

The present invention pertains to a variable restrictor. The restrictor comprises a housing having a high pressure inlet, a channel connected to the high pressure inlet, and a low pressure outlet connected to the channel with the channel disposed between the high pressure inlet and low pressure outlet. The restrictor also comprises a mechanism for reducing supercritical fluid at a pressure between 100–12,000 psi from the high pressure inlet to a pressure between 0–800 psi from the low pressure inlet. The reducing mechanism is disposed in the housing and in contact with the low pressure outlet. The housing has a needle assembly port. The reducing mechanism has a needle assembly with a needle that extends into the channel to reduce the pressure of fluid in the high pressure to a lower pressure as the fluid passes through the channel. The needle assembly is disposed in the needle assembly port. The reducing mechanism assembly has a spring loaded seal which seals the needle in the housing so no fluid can escape by flowing out the needle assembly port.

BRIEF DESCRIPTION OF THE DRAWINGS

In the accompanying drawings, the preferred embodiment of the invention and preferred methods of practicing the invention are illustrated in which:

FIG. 7 is a schematic representation of a needle of the present invention.

DESCRIPTION OF THE PREFERRED EMBODIMENT

Figure 1:
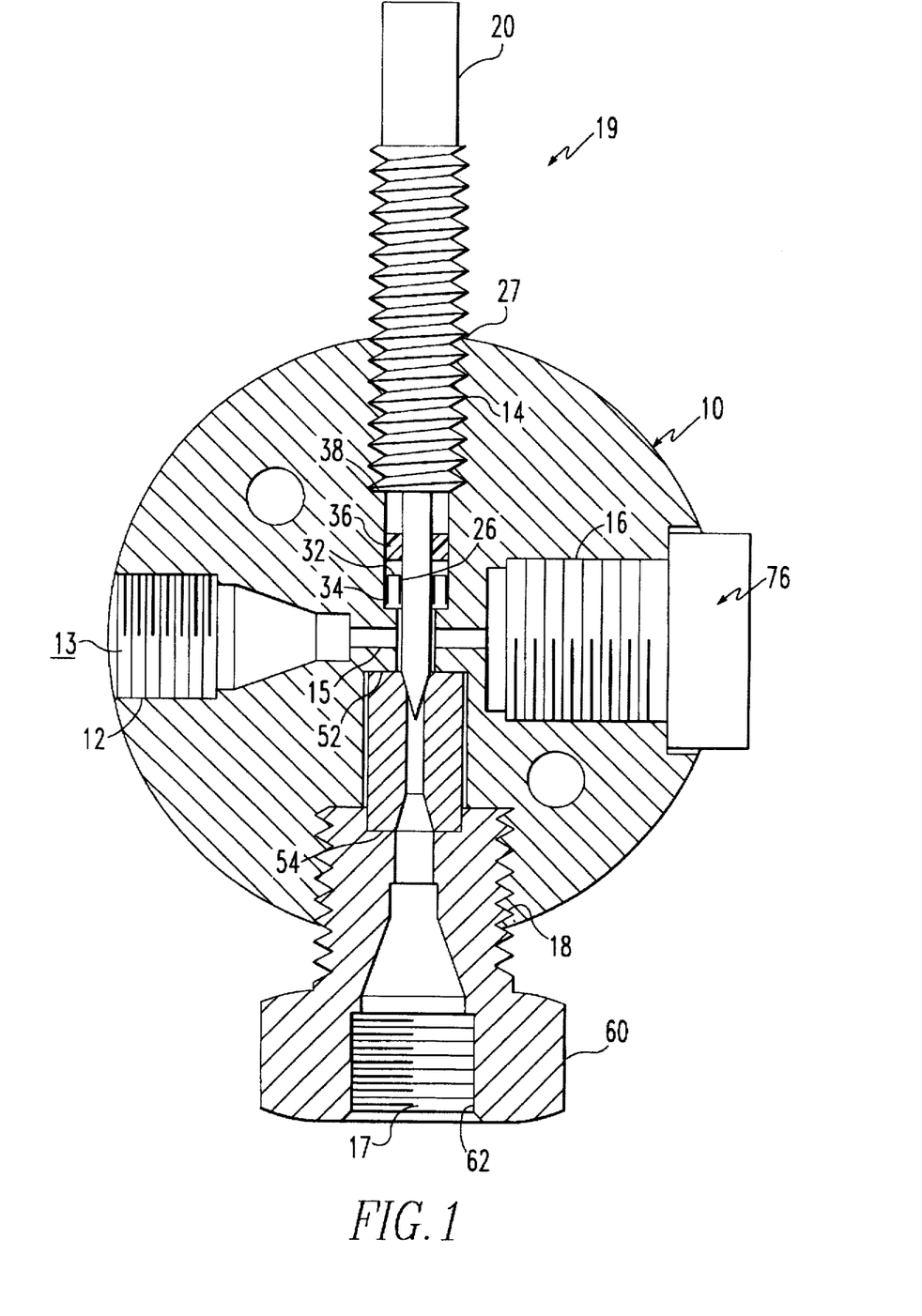
FIG. 1 is a schematic representation of a variable restrictor of the present invention.

Referring now to the drawings wherein like reference numerals refer to similar or identical parts throughout the several views, and more specifically to FIG. 1 thereof, there is shown a variable restrictor 10. The variable restrictor 10 is comprised of a housing 11 having a high pressure inlet 13. The housing 11 also has a channel 15 connected to the high pressure inlet 13. The housing 11 also has a low pressure outlet 17 connected to the channel 15 with the channel 15 disposed between the high pressure inlet 13 and the low pressure outlet 17. The variable restrictor 10 is also comprised of a mechanism 19 for reducing supercritical fluid at a pressure between 100–12,000 psi from the high pressure inlet 13 to a pressure between 0–800 psi from the low pressure outlet 17. The reducing mechanism 19 is disposed in the housing 11 and is in contact with the low pressure outlet 17. Additionally, the variable restrictor 10 is comprised of a pressure transducer 76 disposed in the housing 11 and in contact with the channel 15 to sense the pressure in the channel 15. Preferably, the pressure transducer 76 is in contact with the channel 15 and disposed downstream of the reducing mechanism 19.

The variable restrictor 10 preferably is also comprised of a mechanism for providing heat such as a heater 72, to the channel 15. The providing mechanism is in thermal communication with the channel 15. The variable restrictor 10 can also be comprised of a temperature sensor 74 connected to the channel 15 to sense the temperature in the channel 15.

There can be a controller 21 connected to the pressure transducer 76, the temperature sensor 74 and the reducing mechanism 19 to control the reducing mechanism 19 as a function of the temperature and the pressure of the channel 15 to cause the pressure of fluid from the high pressure inlet 13 to reduce to a desired lower pressure in the low pressure outlet 17.

Preferably, the reducing mechanism 19 has a needle assembly 20 with a needle 22 made of sapphire or alumina oxide ceramic that extends into the channel 15 to reduce the pressure of the fluid in the high pressure inlet to a lower pressure as the fluid passes through the channel 15. Furthermore, the reducing mechanism 19 can include a motor 23 connected to the needle assembly 20 for moving the needle 22 of the needle assembly 20 in the channel 15.

The variable restrictor 10 can also be comprised of a seat 40 made of sapphire or alumina oxide ceramic having a seat channel 25. The seat 40 is disposed in the housing 11 downstream of the reducing mechanism 19. The seat channel 25 is connected with the channel 15 and the low pressure outlet 17 so fluid from the channel 15 passes through the seat channel 25 into the low pressure outlet 17.

The housing 10 preferably has a needle assembly port 27. Preferably, the needle assembly 20 is disposed in the needle assembly port 10. The needle assembly 20 preferably has a spring loaded seal 32 which seals the needle 22 in the housing 11 so no fluid can escape by flowing out the needle assembly port 27.

FIG. 1 depicts the restrictor 10 containing the various embodiments. The restrictor 10 has an input port 12, a threaded port 14 for the needle assembly 20 can move in and out, a port 16 for measuring pressure, and an outlet port 18. The needle assembly consists of a needle 22 which is pressed in a threaded unit 24. The needle 22 has a taper 28 at the end. A spring loaded seal 32 seals the needle and the valve body at the surface 26 and 34. A back up seal 36 is placed behind the spring loaded seal 32 and is held in placed by nut 38. The seat 40 has a taper 42 inside it for the fluid to flow in and out. The seat 40 is wrapped with a heater 72 and a temperature sensor 74. The seat 40 is held inside the restrictor 10 by an insert 60. The seat 40 is sealed on both sides. On one side it seals against the valve body by a seal 52 and on the other side against the insert 60 by another seal 54. The insert 60 has a output port 62 for the fluid to flow out.

By rotating the threaded unit 24, the needle assembly 20 moves in and out of the valve body 20 and controls the space between the needle taper 28 and the seat taper 42. By controlling this space, the amount of fluid leaving the valve is controlled. By measuring the temperature of the fluid by the temperature sensor 74, the heater 72 can be switched on and off to maintain the desired temperature.

The threaded unit 24 can be rotated in and out to control either the pressure or the flow manually. To automate this process, a pressure or a flow sensor can be incorporated either downstream or upstream of the seat. For example, a pressure sensor 76 can be incorporated in the port 16 and the system pressure can be controlled. This is accomplished by connecting a motor to the threaded unit 24.

When the fluid is carbon dioxide, a pressure drop across the seat 40 results in a temperature drop. This could lead to the formation of dry ice which could start collecting at the seat and potentially changing the flow. The formation of dry ice can be prevented by switching the heater 72 on. The temperature of the fluid can be controlled by measuring the temperature through the temperature sensor 74 and controlling the heater 72 based on that.

Figures 6, 7A, 7B:
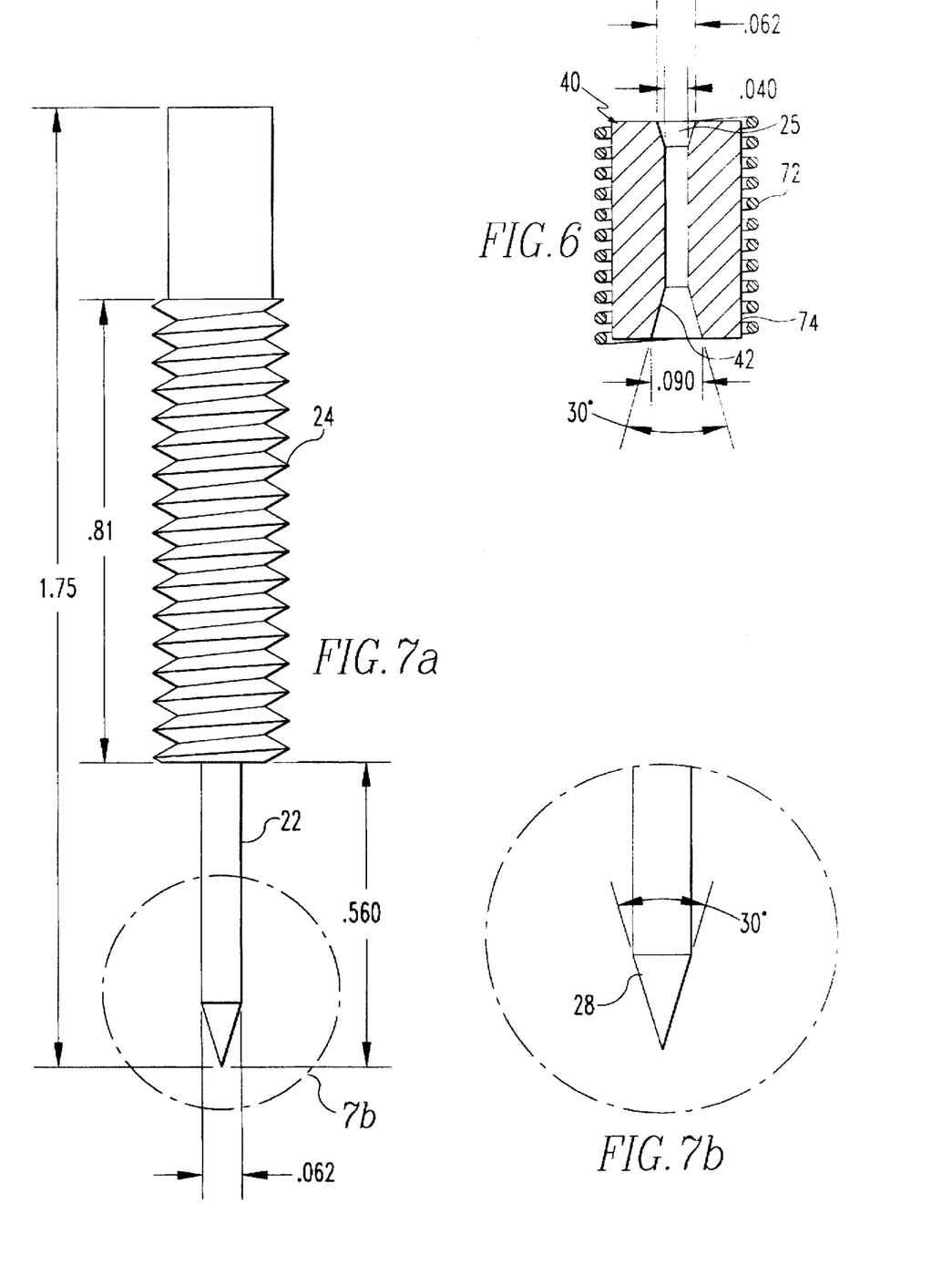
FIG. 6 is a schematic representation of a seat of the present invention.

If the seat 40 is made of a material having a surface smoothness between 0.001 to 1 microns, a hardness of 4–20 mohs, a coefficient of linear thermal expansion of $0-20\times10^{-6}/°C$. and a thermal conductivity of 10–100 W/M-K, such as sapphire or alumina oxide ceramic, it could potentially eliminate many problems. The hardness of sapphire could eliminate any erosion due to the sudden expansion of carbon dioxide and it acting like a sand blasting agent. The high thermal conductivity of sapphire provides instant heat to the depressurizing carbon dioxide and prevents the formation of dry ice. The low thermal expansion of sapphire reduces any changes in the orifice dimensions and the resulting flow variations.

If the needle 22 surface is very smooth, the life of the seal 32 is extended. Again, the needle can be a material having a surface smoothness between 0.001 to 1 microns, a hardness of 4–20 mohs, a coefficient of linear thermal expansion of $0-20\times10^{-6}/°C$. and a thermal conductivity of 10–100 W/M-K, such as sapphire or alumina oxide ceramic. Using the spring loaded seal, provides for self sealing and reduces the torque required to move the threaded unit 24.

Generally,

| | Units | Range | Sapphire | Alumina Oxide Ceramic |
|---|---|---|---|---|
| Surface Smoothness | μm (microns) | .001 to 1. | .05–.015 | .05–.2 |
| Hardness | Mohs | 4–20 | 9 | |
| Coefficient of Linear Thermal Expansion | $\times 10^{-6}/°C$. | 0–20 | 5.0–7.0 | 5.0–8.5 |
| Thermal Conductivity | W/M-K | 10–100 | 42 | 5.0–35 |

Figure 2:
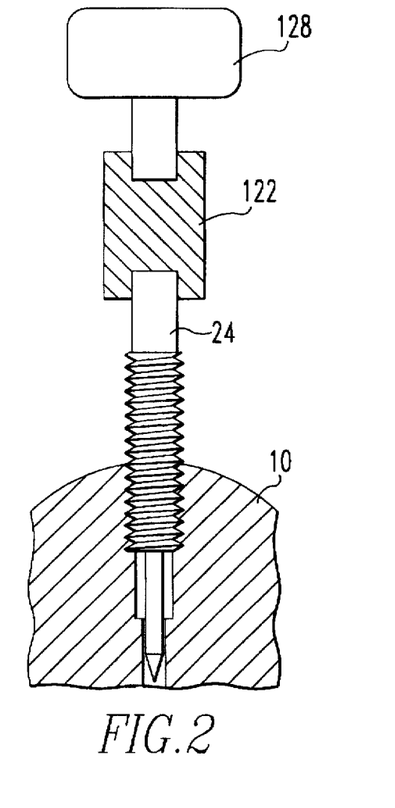
FIG. 2 is a schematic representation of a portion of the variable restrictor.
Figure 3:
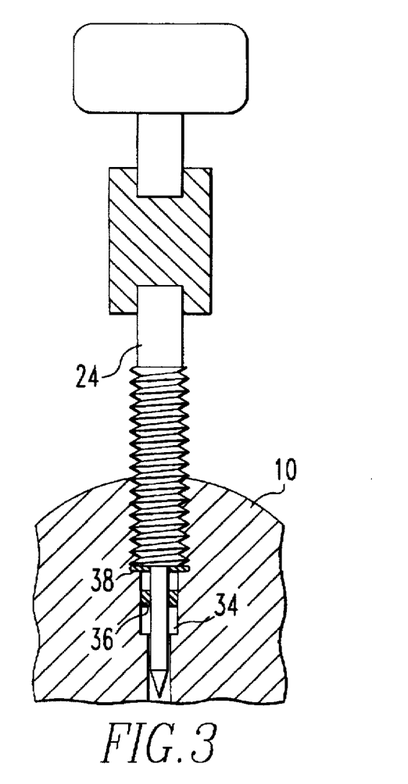
FIG. 3 is a schematic representation of a portion of the variable restrictor.

The needle 22 can be rotated by any mechanism such as a motor which can be connected in a number of different ways. In FIG. 2, the needle 22 is connected to the motor shaft 128 through a motor coupler 122. The motor in FIG. 2 could be either an air motor or an electric motor. In FIG. 3, the needle 22 is connected to a linear actuator. The linear actuator has the capability of controlling the position of the needle and thus controlling the output flow.

The restrictor 10 is designed for control by a computer or other intelligent data-acquisition equipment by way of electronic circuits and motors. Using a PC is one method to control the valve with a data-acquisition card added to it with analog to digital (A/D) and TTL input and output (I/O) ports. This PC and data acquisition card are labeled controller in FIG. 4. The motor driver shown in FIG. 4 receives commands to move from the controller. This command is based on the pressure or flow sensor feedback. The pressure or flow sensor block in FIG. 4 designates a pressure sensor at the valve's input port or a flow sensor at the valve's output port. If the pressure is too large or the flow is too low, the motor turns to open the valve to allow flow. This flow produces a cooling effect which is measured by the thermocouple shown in FIG. 4. The thermocouple is connected to the amplifier and the amplified signal is connected to the controller.

Figure 5:
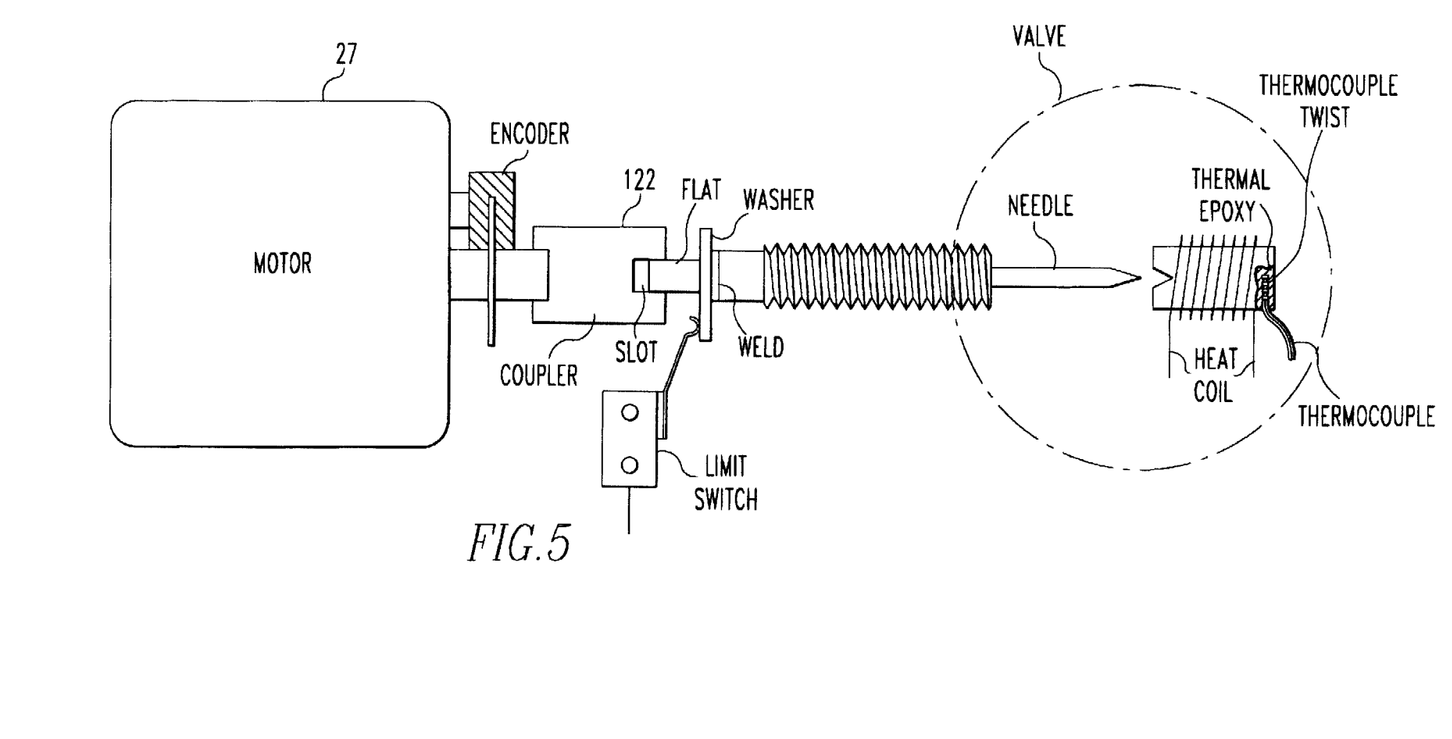
FIG. 5 is a schematic representation of the variable restrictor.

Other sensors which do not need amplification work equally well in this application. The thermocouple's twist, which is where the measurement starts, is contacting the seat surface to get the seat temperature as shown in FIG. 5. The thermocouple and the heat coil may need to be mounted by thermal epoxy which comes in a two part mix. If the temperature drops below some set value of temperature, then the heat relay is turned on by the controller and the power supply gives a certain wattage of energy to the heating coil to warm the valve seat. As the valve is opened further to produce greater flow, more wattage will be supplied by the power supply. If the pressure is too small or the flow is too great, the motor turns to close the valve. The temperature will increase as the amount of depressurizing gas decreases, resulting in the temperature of the thermocouple increasing above the set value. The heat relay will then be turned off so as not to add excess energy to the carbon dioxide.

Figure 4:
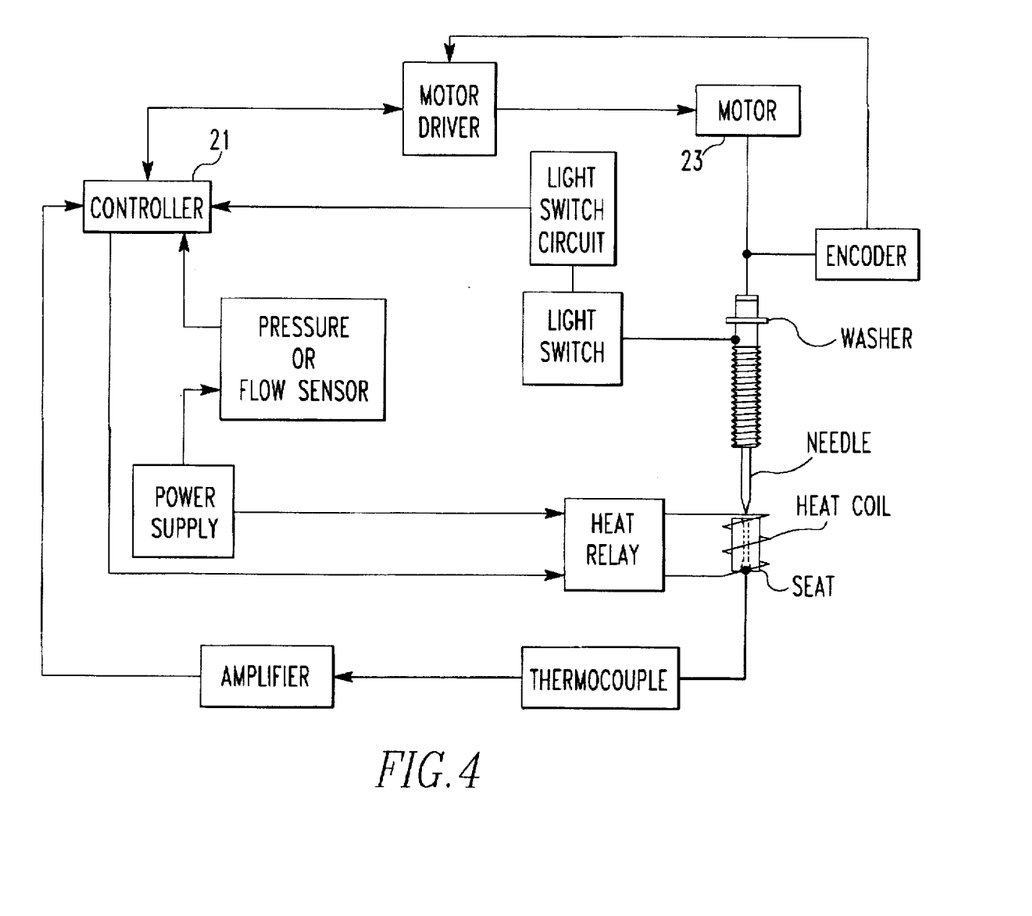
FIG. 4 is a block diagram control of the variable restrictor.

The rotation of the motor is monitored by use of an encoder as shown in FIG. 4 and FIG. 5. This encoder allows algorithmic control of the position for best results of pressure and flow control. The algorithm may work as follows: if the set value of pressure is much lower than the true value of pressure, then the motor driver will control the motor to close very much. If the set value is close to the true value, the motor will turn very little. As the motor turns, a slotted coupler allows the needle flat to move in and out of the coupler without forcing the motor to move with respect to the valve as shown in FIG. 5. A limit switch is necessary to enable alignment of the valve to its most closed position at the beginning and end of its use, and also to protect the needle and seat from being smashed together. A washer is welded or soldered to the needle shaft, as shown in FIG. 4 and FIG. 5, which turns with the needle and moves in and out. The washer allows a mechanical switch to be triggered at a precise location of the needle's position with respect to the seat.

EXAMPLE 1

Needle Size: 0.062"

Needle Material: stainless steel

Seal: Spring loaded graphite reinforced teflon

Shaft Material: Stainless steel

Shaft Surface: 16 micro inches or better

Sensor: Flow

Fluid: Carbon Dioxide

EXAMPLE 2

Needle Size: 0.062"

Needle Material: stainless steel

Seal: Spring loaded graphite reinforced teflon

Shaft Material: Stainless steel

Shaft Surface: 16 micro inches or better

Sensor: Pressure

Fluid: Carbon Dioxide

EXAMPLE 3

Needle Size: 0.062"

Needle Material Sapphire

Seal: Spring loaded graphite reinforced teflon

Shaft Material: Sapphire

Shaft Surface: 8 micro inches or better

Sensor: Flow

Fluid: Carbon Dioxide and Methanol

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A variable restrictor comprising:

a housing having a high pressure inlet, a channel connected to the high pressure inlet, and a low pressure outlet connected to the channel with the channel disposed between the high pressure inlet and low pressure outlet;

a mechanism for reducing supercritical fluid at a pressure between 100–12,000 psi from the high pressure inlet to a pressure between than 0–800 psi from the low pressure outlet, said reducing mechanism disposed in the housing and in contact with the low pressure outlet;

a mechanism for providing heat to the channel, said providing mechanism in thermal communication with the channel so the fluid does not solidify as its pressure is reduced;

a pressure transducer disposed in the housing and in contact with the channel to sense the pressure in the channel; and a controller for controlling the reducing mechanism based on the pressure in the channel sensed by the pressure transducer, said controller connected to the pressure transducer and the reducing mechanism.

2. A variable restrictor as described in claim 1 wherein the pressure transducer is in contact with the channel and disposed downstream of the reducing mechanism.

3. A variable restrictor as described in claim 2 including a temperature sensor connected to the channel to sense the temperature in the channel.

4. A variable restrictor as described in claim 3 including a controller connected to the pressure transducer, the temperature sensor and the reducing mechanism to control the reducing mechanism as a function of the temperature and the pressure of the channel to cause the pressure of fluid from the high pressure inlet to reduce to a desired lower pressure in the low pressure outlet.

5. A variable restrictor as described in claim 4 said reducing mechanism having a needle assembly with a needle made of sapphire or alumina oxide ceramic that extends into the channel to reduce the pressure of fluid in the high pressure inlet to a lower pressure as the fluid passes through the channel.

6. A variable restrictor as described in claim 5 wherein the reducing mechanism includes a motor connected to the needle assembly for moving the needle of the needle assembly in the channel.

7. A variable restrictor as described in claim 6 including a seat made of sapphire or having a seat channel, said seat disposed in the housing downstream of the reducing mechanism, said seat channel connected with the channel and the low pressure outlet so fluid from the channel passes through the seat channel and to the low pressure outlet.

8. A variable restrictor as described in claim 7 wherein said housing has a needle assembly port needle assembly disposed in the needle assembly port, said needle assembly having a spring loaded seal which seals the needle in the housing so no fluid can escape by flowing out the needle assembly port.

9. A method for restricting fluid comprising the steps of:

introducing high pressure fluid at a pressure between 100–12,000 psi into a high pressure port of a housing;

reducing the pressure of the fluid in the high pressure port to a pressure between 0–800 psi as it flows through a channel connected to the high pressure port with a needle of a needle assembly while heat is applied to channel so the fluid does not solidify as its pressure is reduced;

sensing the pressure of the fluid with a pressure transducer connected directly to the channel after the pressure of the fluid has been reduced;

moving the needle of the needle assembly to reduce the pressure of the fluid a desired amount based on the pressure sensed in the channel;

flowing the fluid after its pressure has been reduced through a seat channel of a seat made of sapphire; and releasing the fluid through a low pressure outlet port of the housing.

10. A variable restrictor comprising:

a housing having a high pressure inlet, a channel connected to the high pressure inlet, and a low pressure outlet connected to the channel with the channel disposed between the high pressure inlet and low pressure outlet;

a pressure transducer disposed in the housing and in contact with the channel to sense the pressure in the channel;

a mechanism for reducing supercritical fluid at a pressure between 100–12,000 psi from the high pressure inlet to a pressure between 0–800 psi from the low pressure inlet, said reducing mechanism disposed in the housing and in contact with the low pressure outlet, said reducing mechanism having a needle assembly with a needle made of a material having a surface smoothness between 0.001 to 1 microns, a hardness of 4–20 mohs, a coefficient of linear thermal expansion of 0–20×10$^{-6}$/°C. and a thermal conductivity of 10–100 W/M-K that extends into the channel to reduce the pressure of fluid in the high pressure to a lower pressure as the fluid passes through the channel, said reducing mechanism having a mechanism for providing heat to the channel so the fluid does not solidify as its pressure is reduced, said providing mechanism in thermal communication with the channel; and a controller for controlling the reducing mechanism based on the pressure in the channel sensed by the pressure transducer, said controller connected to the pressure transducer and the reducing mechanism.

11. A variable restrictor as described in claim 10 wherein the reducing mechanism includes a motor connected to the needle assembly for moving the needle of the needle assembly in the channel.

12. A variable restrictor as described in claim 11 wherein the material of the needle is sapphire or alumina oxide ceramic.

13. A variable restrictor comprising:
- a housing having a high pressure inlet, a channel connected to the high pressure inlet, and a low pressure outlet connected to the channel with the channel disposed between the high pressure inlet and low pressure outlet;
- a pressure transducer disposed in the housing and in contact with the channel to sense the pressure in the channel;
- a mechanism for reducing supercritical fluid at a pressure between 100–12,000 psi from the high pressure inlet to a pressure between 0–800 psi from the low pressure inlet, said reducing mechanism disposed in the housing and in contact with the low pressure outlet, said reducing mechanism having a mechanism for providing heat to the channel so the fluid does not solidify as its pressure is reduced, said providing mechanism in thermal communication with the channel;
- a seat made of a material having a surface smoothness between 0.001 to 1 microns, a hardness of 4–20 mohs, a coefficient of linear thermal expansion of $0-20 \times 10^{-6}/°C$. and a thermal conductivity of 10–100 W/M–K having a seat channel, said seat disposed in the housing downstream of the reducing mechanism, said seat channel connected with the channel and the low pressure outlet so fluid from the channel passes through the seat channel and to the low pressure outlet; and
- a controller for controlling the reducing mechanism based on the pressure in the channel sensed by the pressure transducer, said controller connected to the pressure transducer and the reducing mechanism.

14. A variable restrictor as described in claim 13 wherein the material of the seat is sapphire or alumina oxide ceramic.

15. A variable restrictor comprising:
- a housing having a high pressure inlet, a channel connected to the high pressure inlet, and a low pressure outlet connected to the channel with the channel disposed between the high pressure inlet and low pressure outlet;
- a pressure transducer disposed in the housing and in contact with the channel to sense the pressure in the channel;
- a mechanism for reducing supercritical fluid at a pressure between 100–12,000 psi from the high pressure inlet to a pressure between 0–800 psi from the low pressure inlet, said reducing mechanism disposed in the housing and in contact with the low pressure outlet, said housing having a needle assembly port, said reducing mechanism having a needle assembly with a needle that extends into the channel to reduce the pressure of fluid in the high pressure to a lower pressure as the fluid passes through the channel, said needle assembly disposed in the needle assembly port, said reducing mechanism having a spring loaded seal which seals the needle in the housing so no fluid can escape by flowing out the needle assembly port, said reducing mechanism having a mechanism for providing heat to the channel so the fluid does not solidify as its pressure is reduced, said providing mechanism in thermal communication with the channel; and
- a controller for controlling the reducing mechanism based on the pressure in the channel sensed by the pressure transducer, said controller connected to the pressure transducer and the reducing mechanism.

* * * * *